United States Patent
Li et al.

(10) Patent No.: US 12,279,166 B2
(45) Date of Patent: Apr. 15, 2025

(54) METHOD AND APPARATUS FOR MEASUREMENT CONFIGURATION UPDATES FOR INTER-CELL MOBILITY

(71) Applicant: Apple Inc., Cupertino, CA (US)

(72) Inventors: Qiming Li, Beijing (CN); Jie Cui, San Jose, CA (US); Yang Tang, San Jose, CA (US); Fangli Xu, Beijing (CN); Yuqin Chen, Beijing (CN); Yushu Zhang, Beijing (CN); Chunhai Yao, Beijing (CN); Dawei Zhang, Saratoga, CA (US); Manasa Raghavan, Sunnyvale, CA (US); Xiang Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/764,586

(22) PCT Filed: Apr. 2, 2021

(86) PCT No.: PCT/CN2021/085222
§ 371 (c)(1),
(2) Date: Mar. 29, 2022

(87) PCT Pub. No.: WO2022/205409
PCT Pub. Date: Oct. 6, 2022

(65) Prior Publication Data
US 2024/0073748 A1    Feb. 29, 2024

(51) Int. Cl.
*H04W 56/00* (2009.01)
*H04W 36/00* (2009.01)
*H04W 36/08* (2009.01)

(52) U.S. Cl.
CPC ... *H04W 36/0061* (2013.01); *H04W 36/0058* (2018.08); *H04W 36/08* (2013.01)

(58) Field of Classification Search
CPC ......... H04W 36/0061; H04W 36/0058; H04W 36/08
(Continued)

(56) References Cited

U.S. PATENT DOCUMENTS

| | | | |
|---|---|---|---|
| 8,780,801 B2 * | 7/2014 | Nguyen | H04W 36/00835 370/328 |
| 2014/0185475 A1 * | 7/2014 | Ji | H04W 36/0088 370/252 |

(Continued)

FOREIGN PATENT DOCUMENTS

| | | |
|---|---|---|
| CN | 102293034 A | 12/2011 |
| CN | 106465156 A | 2/2017 |

(Continued)

OTHER PUBLICATIONS

"Li , Beam Measuring Method and a Beam Measuring Device, May 1, 2020, CN 111095824" (Year: 2019).*

(Continued)

*Primary Examiner* — Sai Ming Chan
(74) *Attorney, Agent, or Firm* — Eschweiler & Potashnik, LLC; Matthew W Glause

(57) ABSTRACT

A method for a network element is provided. The method comprises: encoding a message for transmission to a user equipment (UE) including neighbor cell configuration information that includes a list of a plurality of neighbor cell groups, wherein each of the plurality of neighbor cell groups is associated with a specific cell; and transmitting the message to the UE.

20 Claims, 6 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2017/0150436 | A1* | 5/2017 | Modarres Razavi | H04W 48/20 |
| 2017/0211898 | A1* | 7/2017 | Schwalm | F28F 1/126 |
| 2022/0014943 | A1* | 1/2022 | Zhang | H04W 48/20 |
| 2022/0167279 | A1* | 5/2022 | Zhou | H04W 52/242 |
| 2022/0225208 | A1* | 7/2022 | Wang | H04W 36/00835 |
| 2022/0286918 | A1* | 9/2022 | Wang | H04W 4/06 |

FOREIGN PATENT DOCUMENTS

| | | |
|---|---|---|
| CN | 111316693 A | 6/2020 |
| EP | 3358881 A | 1/2005 |
| WO | 2011160511 A | 12/2011 |

OTHER PUBLICATIONS

"Zhang, Cell Handoff Method, System, Base Station and Computer Storage Medium, Oct. 16, 2014, WO 201466456" (Year: 2014).*
PCT Search Report dated Dec. 30, 2021 in connection with PCT Application No. PCT/CN2021/085222.
PCT Written Opinion dated Dec. 31, 2021 in connection with PCT Application No. PCT/CN2021/085222.
5G; NR; Radio Resource Control (RRC); Protocol specification (3GPP TS 38.331 version 15.12.0 Release 15); ETSI TS 138 331 V15.12.0 (Jan. 2021).
3rd Generation Partnership Project; Technical Specification Group Radio Access Network; NR; User Equipment (UE) radio access capabilities (Release 16); 3GPP TS 38.306 V16.4.0 (Mar. 2021); http://www.3gpp.org.
3rd Generation Partnership Project; Technical Specification Group Radio Access Network; NR; Requirements for support of radio resource management (Release 16); 3GPP TS 38.133 V16.6.0 (Dec. 2020); http://www.3gpp.org.

* cited by examiner

600 encoding a message including neighbor cell configuration information that includes a list of a plurality of neighbor cell groups
602

transmitting the message to the UE
604

FIG. 6

700 encoding an indication that indicates, through one or more neighbor cell group identifications, which one or more neighbor cell groups will be activated or deactivated by the UE
702

transmitting the indication to the UE via an L1/L2 command
704

FIG. 7

METHOD AND APPARATUS FOR MEASUREMENT CONFIGURATION UPDATES FOR INTER-CELL MOBILITY

This application is a National Phase entry application of International Patent Application No. PCT/CN2021/085222 filed Apr. 2, 2021, entitled "METHOD AND APPARATUS FOR MEASUREMENT CONFIGURATION UPDATES FOR INTER-CELL MOBILITY" the contents of which are herein incorporated by reference in their entirety.

FIELD OF THE INVENTION

The present disclosure may relate in general to a field of wireless communications including methods and apparatus for measurement configuration updates for inter-cell mobility.

BACKGROUND

A handover procedure is used to hand over a user equipment (UE) from a source cell (e.g., a serving cell) to a target cell. A radio resource control (RRC) Connection Reconfiguration message is sent from the source cell to the UE, and the UE detaches from the source cell and tries attachment with the target cell. After the success of the attachment process, the UE sends an RRC Connection Reconfiguration Complete message to its new serving cell, e.g., the target cell. A handover procedure based on RRC signaling may take hundreds of milliseconds.

Layer 1 and/or Layer 2 (L1/L2) based mobility, for example, handover procedures based on L1/L2 commands, are being considered. A handover procedure based on L1/L2 commands may take a few to a dozen milliseconds.

SUMMARY

An aspect of the present disclosure mainly aims to methods and apparatus for measurement configuration updates for inter-cell mobility.

In accordance with some exemplary aspects of the present disclosure, a method for a network element (NW) is provided. The method may comprise: encoding a message for transmission to a user equipment (UE) including neighbor cell configuration information that includes a list of a plurality of neighbor cell groups, wherein each of the plurality of neighbor cell groups is associated with a specific cell; and transmitting the message to the UE.

In accordance with some exemplary aspects of the present disclosure, a method for a network element (NW) is provided. The method may comprise: encoding an indication for transmission to a user equipment (UE) that indicates which one or more neighbor cell groups in neighbor cell configuration information will be activated or deactivated by the UE, wherein the neighbor cell configuration information is configured by the NW element or another, the neighbor cell configuration information includes a list of a plurality of neighbor cell groups, and each of the plurality of neighbor cell groups is associated with a specific cell; and transmitting the indication to the UE via an L1/L2 command.

In accordance with some exemplary aspects of the present disclosure, a network (NW) element is provided. The network (NW) element may comprise: processor circuitry configured to cause the NW element to perform any of the above mentioned methods for NW elements.

In accordance with some exemplary aspects of the present disclosure, an apparatus for operating a network (NW) element is provided. The apparatus may comprise: processor circuitry configured to cause the NW element to perform any of the above mentioned methods for NW elements.

In accordance with some exemplary aspects of the present disclosure, a method for a user equipment (UE) is provided. The method may comprise: receiving a message from a network (NW) element, the message including neighbor cell configuration information that includes a list of a plurality of neighbor cell groups, wherein each of the plurality of neighbor cell groups is associated with a specific cell; and storing the neighbor cell configuration information and performing a measurement according to the neighbor cell configuration information.

In accordance with some exemplary aspects of the present disclosure, a method for a user equipment (UE) is provided. The method may comprise: encoding a message for transmission to a network (NW) element including a UE capability information that includes at least one of: an indication of a maximum number of neighbor cell groups that can be supported by the UE; an indication of a maximum number of neighbor cells in each neighbor cell group that can be supported by the UE; an indication of a maximum number of activated neighbor cell groups that can be supported by the UE; an indication of whether the UE supports performing activation/deactivation on a neighbor cell group without an indication from the NW element or another while a serving cell being changed; or an indication of whether the UE supports updating a reference cell for a relative measurement without an indication from the NW element or another while a serving cell being changed, and transmitting the message to the NW element.

In accordance with some exemplary aspects of the present disclosure, a user equipment (UE) is provided. The UE may comprise: processor circuitry configured to cause the UE to perform any of the above mentioned methods for UEs.

In accordance with some exemplary aspects of the present disclosure, an apparatus for operating a user equipment (UE) is provided. The apparatus may comprise: processor circuitry configured to cause the UE to perform any of the above mentioned methods for UEs.

In accordance with some exemplary aspects of the present disclosure, a non-transitory computer-readable memory medium is provided. The non-transitory computer-readable memory medium may store program instructions, where the program instructions, when executed by a computer system, cause the computer system to perform any of the above mentioned methods.

In accordance with some exemplary aspects of the present disclosure, a computer program product is provided. The computer program product may comprise program instructions which, when executed by a computer, cause the computer to perform any of the above mentioned methods.

BRIEF DESCRIPTION OF THE DRAWINGS

The above and other aspects and advantages of the present disclosure will become apparent from the following detailed description of exemplary aspects taken in conjunction with the accompanying drawings which illustrate, by way of example, the principles of the present disclosure. Note that the drawings are not necessarily drawn to scale.

FIG. 6 is a flowchart diagram illustrating an example method for a NW element, according to some aspects;

FIG. 7 is a flowchart diagram illustrating an example method for a NW element, according to some aspects;

Figure 1:
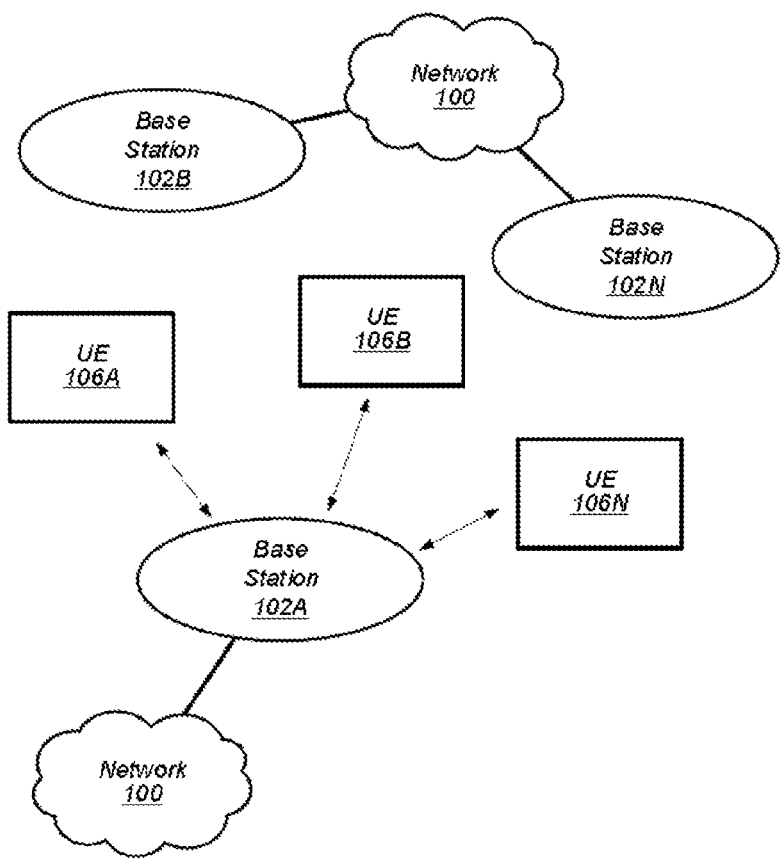
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE PREFERRED EMBODIMENTS

Exemplary Terminology

For the purposes of the present document, the following terms and definitions are applicable to the examples and aspects discussed herein, but are not meant to be limiting.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry".

The term "user equipment" (UE) (or "UE device") as used herein refers to, is part of, or includes any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™) laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

The term "base station" has the full breadth of its ordinary meaning, and at least includes a wireless communication station installed at a fixed location and used to communicate as part of a wireless telephone system or radio system.

The term "network element" as used herein refers to physical or virtualized equipment and/or infrastructure used to provide wired or wireless communication network services. The term "network element" may be considered synonymous to and/or referred to as a network device, networked computer, networking hardware, network equipment, network node, router, switch, hub, bridge, radio network controller, RAN device, RAN node, gateway, server, virtualized VNF, NFVI, and/or the like. The term "base station" may be considered synonymous to, and may be referred to as, "network element".

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "band" has the full breadth of its ordinary meaning, and at least includes a section of spectrum (e.g., radio frequency spectrum) in which channels are used or set aside for the same purpose.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

The phrase "in various aspects", "in some aspects", and the like may refer to the same, or different, aspects. The terms "comprising", "having", and "including" are synonymous, unless the context dictates otherwise. The phrase "A and/or B" means (A), (B), or (A and B). The phrases "A/B" and "A or B" mean (A), (B), or (A and B), similar to the phrase "A and/or B". For the purposes of the present disclosure, the phrase "at least one of A and B" means (A), (B), or (A and B). The description may use the phrases "in an aspect", "in aspects", "in some aspects", and/or "in various aspects", which may each refer to one or more of the same or different aspects. Furthermore, the terms "comprising", "including", "having", and the like, as used with respect to aspects of the present disclosure, are synonymous.

In the following detailed description, numerous specific details are set forth to provide a thorough understanding of the described exemplary aspects. It will be apparent, however, to one skilled in the art that the described aspects can be practiced without some or all of these specific details. In other exemplary aspects, well known structures or process steps have not been described in detail in order to avoid unnecessarily obscuring the concept of the present disclosure.

Communication System

FIG. 1 illustrates a simplified example wireless communication system, according to some aspects. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell". The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighbor cells" or "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Figure 2:
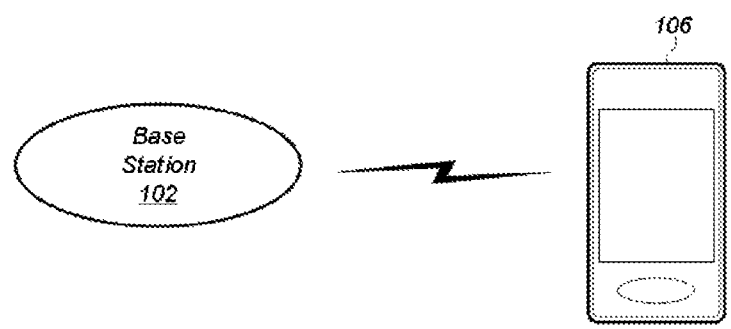
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a handheld device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Block Diagram of a UE

Figure 3:
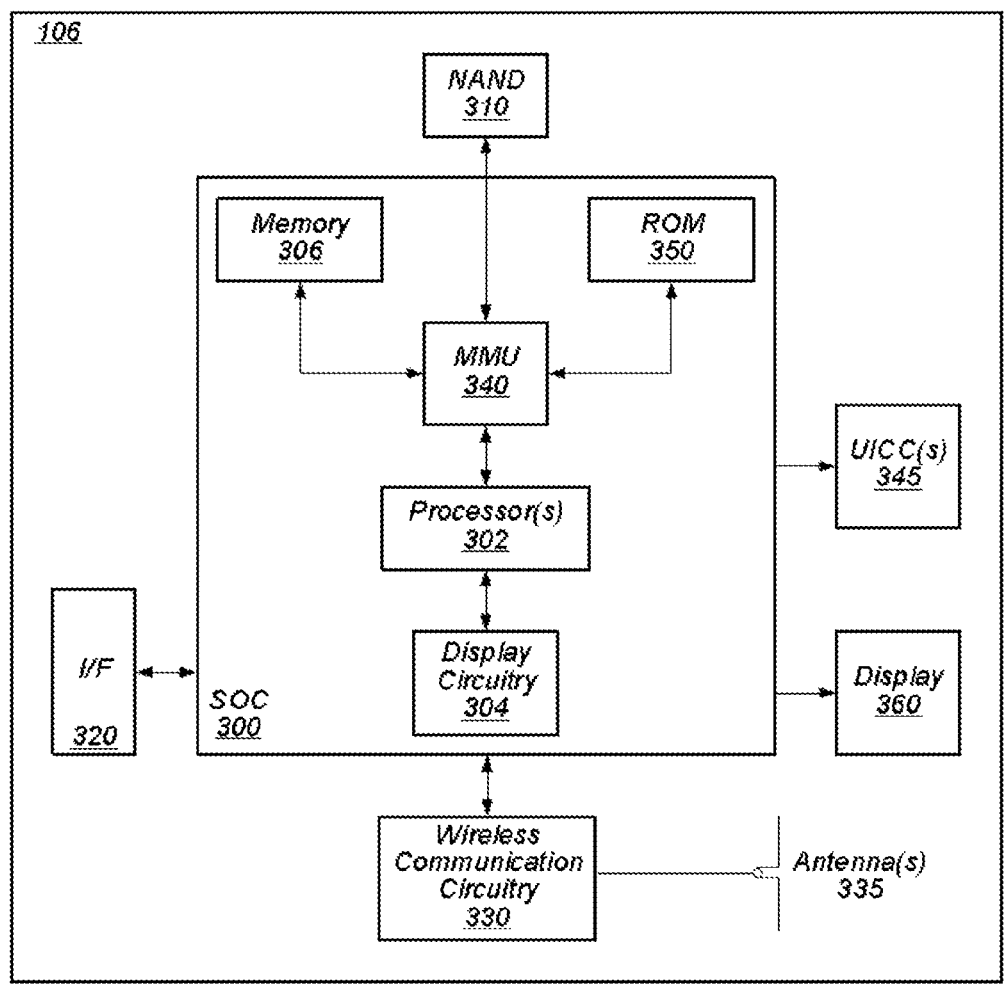
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Block Diagram of a Base Station

Figure 4:
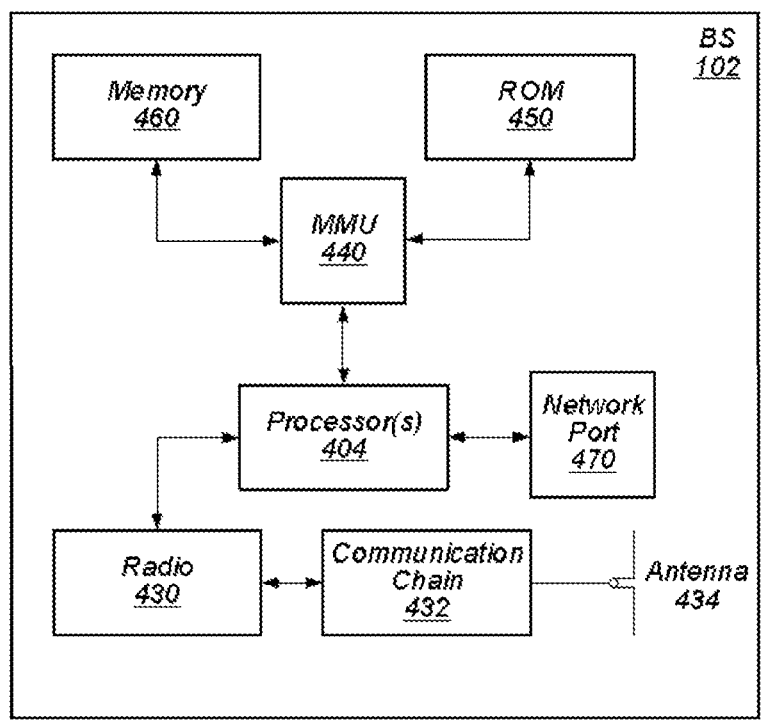
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Block Diagram of Cellular Communication Circuitry

Figure 5:
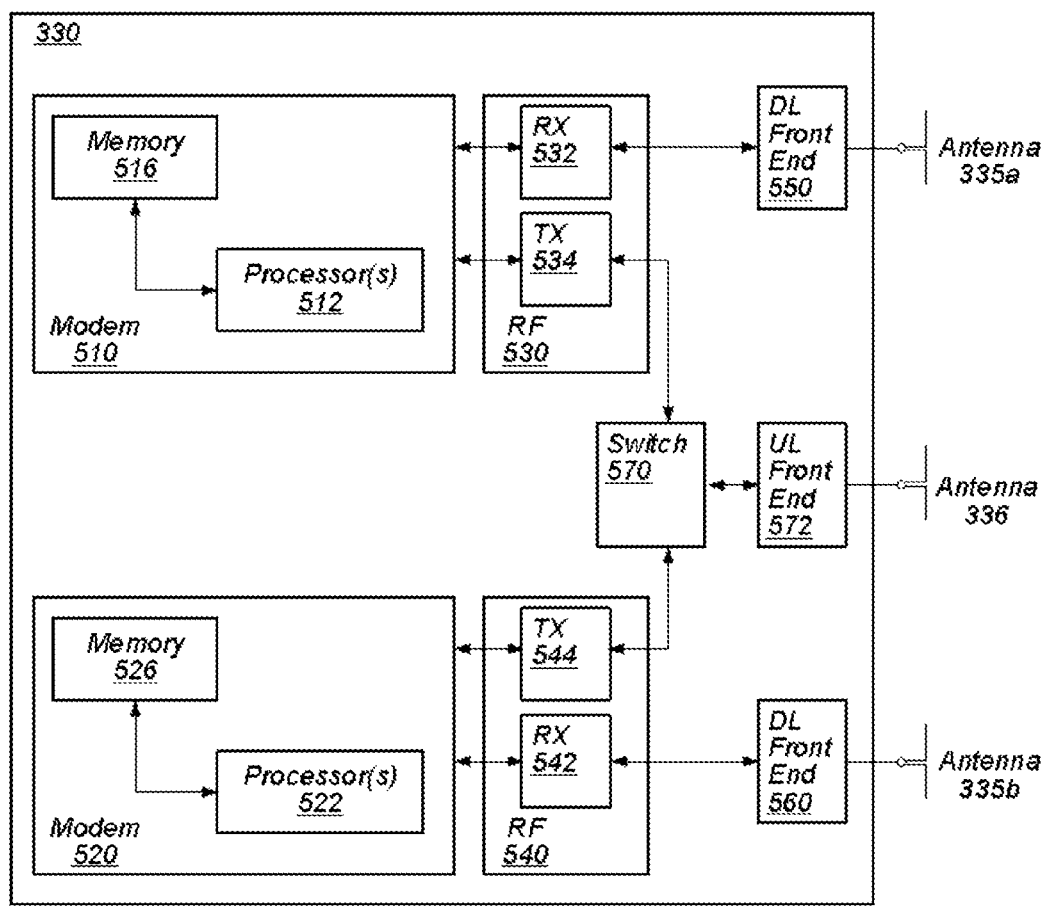
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Among other things, aspects described herein are directed to L1/L2 based mobility for new radio (NR) systems. As mentioned above, the L1/L2 based handover procedure may significantly reduce the handover latency. But unlike RRC signaling, the L1/L2 based command is relatively small and cannot contain all the parameters needed for handover. The present disclosure proposes that some parameters (for example, usually relatively static parameters) may be configured through RRC signaling before the handover, for example, when the RRC connection is established or later. These parameters configured in advance may include measurement related configuration information.

Figure 8:
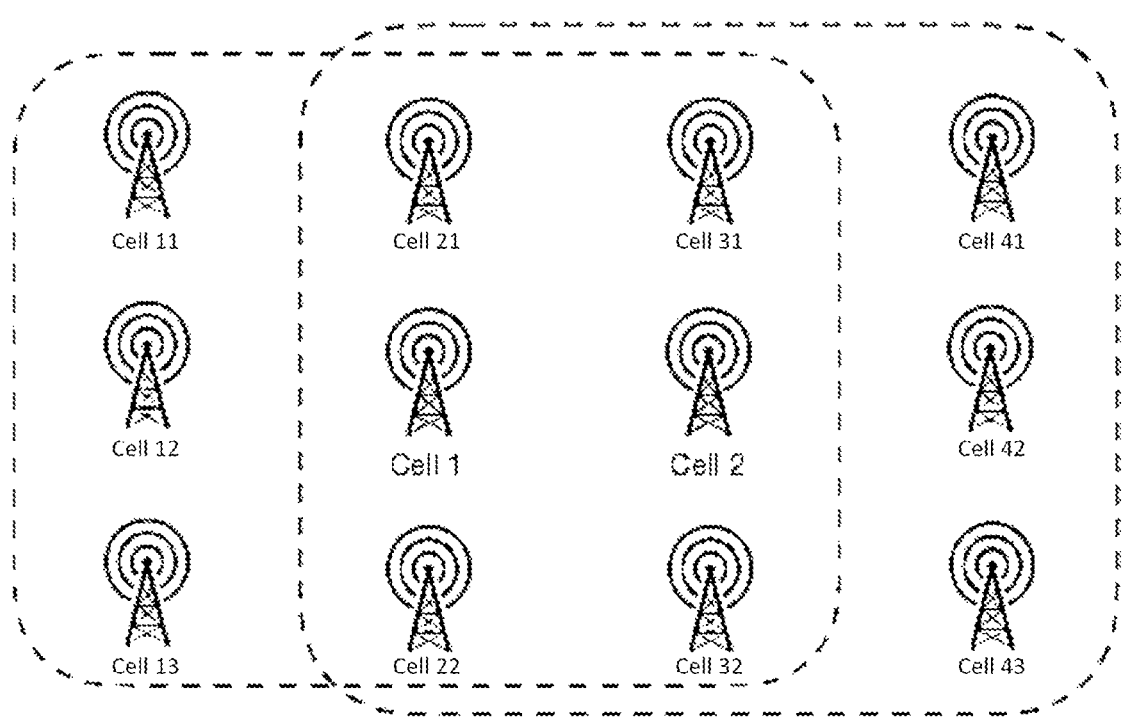
FIG. 8 is a diagram illustrating neighbor cell groups.

A concept of "neighbor cell group" (NCG) is proposed in the present disclosure. An NCG is associated with a specific cell and includes one or more neighbor cells need to be measured when the specific cell is a serving cell. For a specific cell, the maximum number of neighbor cells in an NCG may be determined based on UE capability. For a specific cell, up to a specified number of cells can be configured, where the specified number (e.g., a maximum number of neighbor cells in a sublist of neighbor cells of the specific cell) is equal to a maximum number of entries in a cell list of the specific cell corresponding to a measurement object. In some examples, referring to the NW topology shown in FIG. 8, the NCG associated with Cell 1 (referred to as "NCG 1" hereinafter) may include Cell 11, Cell 12, Cell 13, Cell 21, Cell 22, Cell 31, Cell 2 and Cell 32. The NCG associated with Cell 2 (referred to as "NCG 2" hereinafter) may include Cell 21, Cell 1, Cell 22, Cell 31, Cell 32, Cell 41, Cell 42 and Cell 43. Although not shown with dotted rectangular blocks, the NCG associated with Cell 13 (referred to as "NCG 3" hereinafter) may include Cell 12, Cell 1 and Cell 22, the NCG associated with Cell 41 (referred to as "NCG 4" hereinafter) may include only one cell (for example, Cell 2), and the like.

An NW element (also referred to as "NW" herein for simplicity) may configure, for a UE, one or more NCGs according to geographical locations of cells in the NW. The geographic locations of cells in the NW may be obtained from NW topologies. The NW may determine the number of the NCGs configured to the UE based at least on the UE capability reported from the UE and/or NW topologies. For example, if the UE established an RRC connection with the NW in the geographical area shown in FIG. 8, the NW may configure a list of NCGs for the UE. In some aspects, the list of NCGs may include NCG 1 and NCG 2. In some other aspects, the list of NCGs may include more NCGs, for example, NCG 1 through NCG 4.

After the RRC connection is established, the UE is configured with multiple NCGs. In some aspects, these NCGs may be in a deactivated state by default, that is, the UE does not measure neighboring cells included in these NCGs. Until the UE receives an indication from the NW (may be from the NW element that configures the NCGs or another NW element) to require the UE to activate a specific NCG, the UE does not start to measure the neighboring cells included in the specific NCG. In the L1/L2 based handover procedure, the NW instructs the UE to switch the serving cell through a L1/L2 handover command. In this situation, large configuration information including all neighboring cells of the target cell as in the RRC Connection Reconfiguration message no longer needs to be included in the L1/L2 handover command. The NW only needs to instruct the UE which NCG(s) needs to be activated and which NCG(s) needs to be deactivated after handover.

Exemplary Methods of Operations for a NW Element

FIG. 6 is a flowchart diagram illustrating an example method 600 for a NW element, according to some aspects. Aspects of the method 600 may be implemented by a base station such as a BS 102 illustrated in various of the Figures herein and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various aspects, some of the elements of the methods shown may be performed concurrently, in a different order than shown, may be substituted for by other method elements, or may be omitted. Additional elements may also be performed as desired. As shown, the method 600 may operate as follows.

At 602, a NW element may encode a message for transmission to a user equipment (UE) including neighbor cell configuration information that includes a list of a plurality of neighbor cell groups (NCGs), wherein each of the plurality of neighbor cell groups is associated with a specific cell. At 604, the NW element may transmit the message to the UE.

According to some aspects, the NW element may transmit the message including neighbor cell configuration information to the UE via radio resource control (RRC) signalling (e.g., RRC Connection Configuration message) when the UE is in a connected mode. The UE may receive the message via RRC signalling, store the neighbor cell configuration information, and perform measurements in the connected mode according to the neighbor cell configuration information. According to some aspects, in response to the UE is in an idle mode or inactive mode, the NW element may transmit the message including neighbor cell configuration information to the UE via a broadcast message. The UE may receive the message via broadcast message(s), store the neighbor cell configuration information, and perform measurements in the idle mode or inactive mode according to the neighbor cell configuration information.

According to some aspects, the list of the plurality of NCGs may include NCG identifications (IDs) for respective neighbor cell groups. The NCG identifications may be used by the NW to indicate which NCGs will be activated or deactivated. For example, if the NW configures a list of NCGs for the UE with NCG 1 through NCG 4, the NCG IDs for respective NCGs may be 1, 2, 3 and 4.

According to some aspects, the list of the plurality of NCGs may include cell identifications for respective specific cells. That is to say, the NW tell the UE, in the neighbor cell configuration information, the specific cell associated with each NCG. The UE may perform activation/deactivation on associated NCG(s) after handover without any indication from the NW. The cell identifications for the respective specific cells may include physical cell identities (PCIs), cell identities (IDs) or public land mobile network (PLMN) IDs for the respective specific cells.

According to some aspects, the list of the plurality of neighbor cell groups may include a sublist of one or more neighbor cells of the specific cell, and the sublist of one or more neighbor cells includes cell identifications and measurement related parameters for respective neighbor cells. The cell identifications may be PCIs. The measurement related parameter for respective neighbor cells may include an offset to be applied to a corresponding neighbor cell when evaluating triggering conditions for measurement reporting, similar to the Q-OffsetRangeList as defined in TS 38.331.

FIG. 7 is a flowchart diagram illustrating an example method 700 for a NW element, according to some aspects. Aspects of the method 700 may be implemented by a base station such as a BS 102 illustrated in various of the Figures herein and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various aspects, some of the elements of the methods shown may be performed concurrently, in a different order than shown, may be substituted for by other method elements, or may be omitted. Additional elements may also be performed as desired. As shown, the method 600 may operate as follows.

At 702, a NW element may encode an indication for transmission to the UE that indicates, through one or more neighbor cell group identifications, which one or more neighbor cell groups in the plurality of neighbor cell groups will be activated or deactivated by the UE. At 704, the NW element may transmit the indication to the UE via an L1/L2 command. In some aspects, the indication may be transmitted after a connection is established, for example, when an RRC connection is established or later. In some aspects, the indication may be transmitted before a handover is performed, for example, through a L1/L2 based handover command. In some aspects, the indication may be transmitted after a handover is performed (or completed), for example, through a L1/L2 based command separated from the L1/L2 based handover command.

According to some aspects, the L1/L2 command may include a downlink control information (DCI) command or a media access control (MAC) control element (CE) command. In some aspects, the indication may include one or more identifiers for indicating the one or more neighbor cell group identifications and an identifier for indicating activation or deactivation. In some aspects, the indication may be implemented as a bit map in a DCI command or a MAC CE. A bit string with each bit mapping an activation/deactivation command may be introduced in a DCI command or a MAC CE so as to control the activation/deactivation of each NCG. For instance, a bit string with 8 bit length may be defined for the controlling of up to 8 NCGs, as shown in Table 1. In an example, an identifier "1" in the first bit in the string indicates the NCG with the NCG ID 1 will be activated, an identifier "0" in the second bit in the string indicates the NCG with the NCG ID 2 will be activated, and the like.

TABLE 1

| NCG ID 1 | NCG ID 2 | NCG ID 3 | NCG ID 4 | . . . |
|---|---|---|---|---|
| 1 | 0 | 0 | 0 | . . . |

In some aspects, the indication may be implemented as a field with a predefined format in a DCI command or a MAC CE. A new DCI format or a new MAC CE may be introduced to control the activation/deactivation of each NCG. In the new DCI format or the new MAC CE, two information may be included, as shown in Table 2. An identifier for NCG control information is an indication to indicate the UE to activate or deactivate an NCG, the other identifier for NCG information is the NCG ID of the NCG that is indicated. In the example shown in Table 2, the NCG information is represented by 3 bits. In other examples, the NCG information may be represented by more or less bits.

TABLE 2

| NCG control information (1 bit) | NCG information (3 bits) |
|---|---|
| 1: activated; 0: deactivated | NCG ID |

According to some aspects, the NW may encode an indication for transmission to the UE that indicates which one or more cells are reference cells for relative measurements performed by the UE; and may transmit the indication to the UE via an L1/L2 command. In some measurement report triggering, a relative measurement (a measurement relative to a reference cell) is required, such as event A3 (a neighbor cell becomes offset better than an SpCell) or event A5 (an SpCell becomes worse than a first threshold and a neighbor cell becomes better than a second threshold). In a relative measurement, the UE needs to compare a measurement result of a neighbor cell to that of the reference cell. In a case with a simple NW configuration, for example a scenario where the UE has only accessed one serving cell, the UE may automatically change the reference cell from the source cell to the target cell along with a handover. However, in a case with a complicated NW configuration, for example a scenario where the UE accesses multiple serving cells, the NW may indicate to the UE which cell(s) will be used as the reference cell(s) after a handover. If more than one reference cells are configured, the NW may further indicate the relative measurement based on the minimal, maximum, or average measurement results (e.g., reference signal receiving power (RSRP)) of the multiple reference cells.

Exemplary Operations for a UE

According to some aspects, the UE may receive a message from a NW element, the message including neighbor cell configuration information as described above, and then the UE may store the neighbor cell configuration information for future use, for example, performing a future measurement according to the neighbor cell configuration information.

According to some aspects, the UE may receive the message via radio resource control (RRC) signalling in a connected mode and perform a connected mode measurement according to the neighbor cell configuration information included in the message received in the connected mode. According to some aspects, the UE may receive the message via radio resource control (RRC) signalling in a connected mode and perform a future idle/inactive mode measurement according to the neighbor cell configuration information included in the message received in the connected mode. That is to say, after the UE returns to an idle mode or inactive mode from the connected mode, the neighbor cell configuration information included in the message received in the connected mode may also be used in the idle/inactive mode measurement.

According to some aspects, in the L1/L2 based handover procedure, the UE may receive from the NW (may be the NW element that configures the neighbor cell configuration information or another NW element) an indication via an L1/L2 command (i.e., a DCI command or a MAC CE as described above), wherein the indication indicates, through one or more NCG IDs, which one or more NCGs in the neighbor cell configuration information will be activated or deactivated by the UE. Then the UE may perform corresponding activation or deactivation operations on the one or more NCGs according to the one or more NCG IDs. With receiving an indication of activating an NCG, the UE may start performing measurements on the one or more neighbor cells in the NCG until another indication being received. With receiving an indication of deactivating an NCG, the UE may stop performing measurements on the one or more neighbor cells in the NCG until another indication being received.

According to some aspects, the UE may automatically perform activation/deactivation on associated NCG(s) after handover without any indication from the NW, if the UE knows the specific cell associated with each NCG. The NW may tell the UE, in the neighbor cell configuration information, the specific cell associated with each NCG, as described above. The UE may perform activation on an NCG associated with a specific cell after accessing to the specific cell and perform deactivation on an NCG associated with a specific cell after detaching from the specific cell.

Whether the UE can automatically perform activation/deactivation may be configured by the NW. NW may allow or prohibit the UE to perform activation/deactivation automatically. It will be appreciated that this will also depend on the capability of the UE. After the UE reports to the NW that it has the capability of perform activation/deactivation automatically, the NW may decide whether to allow the UE to perform activation/deactivation automatically.

According to some aspects, the UE may receive from the NW an indication via an L1/L2 command (e.g., MAC CE, or DCI), wherein the indication indicates which one or more cells are reference cells for relative measurements performed by the UE, and the UE may apply the one or more cells as the reference cells for the relative measurements. According to some aspects, the UE may receive from the NW an indication via one of an RRC signalling, an MEC CE or a DCI, wherein the indication indicates whether the UE is allowed to switch a reference cell autonomously. In response to the UE is allowed to switch a reference cell autonomously, the UE may switch a new cell as a new reference cell for future relative measurements upon a serving cell being changed to the new cell (or upon detecting L1/L2 inter-cell mobility) without an indication of switching a reference cell from the NW.

According to some aspects, the UE may report UE capability to the NW. The UE may encode a message for transmission to the NW including a UE capability information and transmit the message to the NW. The UE capability information may include at least one of: an indication of a maximum number of neighbor cell groups that can be supported by the UE; an indication of a maximum number of neighbor cells in each neighbor cell group that can be supported by the UE; an indication of a maximum number of activated neighbor cell groups that can be supported by the UE; an indication of whether the UE supports performing activation/deactivation on a neighbor cell group without an indication from the NW element or another while a serving cell being changed (i.e., performing activation/deactivation automatically as described above); and an indication of whether the UE supports updating a reference cell for a relative measurement without an indication from the NW element or another while a serving cell being changed (especially in a case with a simple NW configuration as described above).

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Those skilled in the art may clearly know from the above aspects that the present disclosure may be implemented by software with necessary hardware, or by hardware, firmware and the like. Based on such understanding, the aspects of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective aspect of the present disclosure.

The present disclosure being thus described, it will be obvious that the same may be varied in many ways. Such variations are not to be regarded as a departure from the spirit and scope of the present disclosure, and all such modifications as would be obvious to those skilled in the art are intended to be included within the scope of the following claims.

What is claimed is:

1. An apparatus for operating a network (NW) element, the apparatus comprising:
processor circuitry configured to cause the NW element to:
encode a message for transmission to a user equipment (UE) including neighbor cell configuration information that includes a list of a plurality of neighbor cell groups, wherein the plurality of neighbor cell groups corresponds to respective serving cells; and
transmit the message to the UE.

2. The apparatus according to claim 1, wherein processor circuitry is further configured to cause the NW element to:
transmit the message to the UE via radio resource control (RRC) signaling in response to the UE is in a connected mode, and/or
transmit the message to the UE via a broadcast message in response to the UE is in an idle mode or inactive mode.

3. The apparatus according to claim 1, wherein the processor circuitry is further configured to cause the NW element to:
determine, before the encoding, a number of neighbor cell groups in the list of the plurality of neighbor cell groups based on a UE capability reported from the UE and/or a NW topology.

4. The apparatus according to claim 1, wherein the list of the plurality of neighbor cell groups includes neighbor cell group identifications for respective neighbor cell groups.

5. The apparatus according to claim 1, wherein the list of the plurality of neighbor cell groups includes cell identifications for the respective serving cells.

6. The apparatus according to claim 5, wherein the cell identifications for the respective serving cells include one or more of physical cell identities (PCIs), cell identities (IDs) or public land mobile network (PLMN) IDs for the respective serving cells.

7. The apparatus according to claim 1, wherein the list of the plurality of neighbor cell groups includes a sublist of one or more neighbor cells of the respective serving cells, and the sublist of one or more neighbor cells includes cell identifications and measurement related parameters for respective neighbor cells.

8. The apparatus according to claim 7, wherein the cell identifications are corresponding PCIs for each of the one or more neighbor cells.

9. The apparatus according to claim 7, wherein a maximum number of neighbor cells in the sublist is a maximum number of entries in a cell list of the respective serving cells corresponding to a measurement object.

10. The apparatus according to claim 7, wherein the measurement related parameters for respective neighbor cells includes an offset to be applied to a corresponding neighbor cell when evaluating triggering conditions for measurement reporting.

11. The apparatus according to claim 7, wherein the processor circuitry is further configured to cause the NW element to:
encode an indication for transmission to the UE that indicates, through one or more neighbor cell group identifications, which one or more neighbor cell groups in the plurality of neighbor cell groups will be activated or deactivated by the UE; and
transmit the indication to the UE via an Layer 1/Layer 2 (L1/L2) command.

12. The apparatus according to claim 11, wherein the L1/L2 command includes a downlink control information (DCI) command or a media access control (MAC) control element (CE) command.

13. The apparatus according to claim 11, wherein the indication includes one or more identifiers for indicating the one or more neighbor cell group identifications and/or an identifier for indicating activation or deactivation.

14. The apparatus according to claim 11, wherein the indication is implemented as a bit map or a field with a predefined format in the L1/L2 command.

15. The apparatus according to claim 11, wherein the indication is transmitted after a connection is established, before a handover is performed and/or after a handover is performed.

16. The apparatus according to claim 1, wherein the processor circuitry is further configured to cause the NW element to:
encode an indication for transmission to the UE that indicates which one or more cells are reference cells for relative measurements performed by the UE; and
transmit the indication to the UE via an Layer 1/Layer 2 command.

17. An apparatus for operating a user equipment (UE), the apparatus comprising:

processor circuitry configured to cause the UE to:

receive a message from a network (NW) element, the message including neighbor cell configuration information that includes a list of a plurality of neighbor cell groups, wherein each of the plurality of neighbor cell groups corresponds to respective serving cells; and store the neighbor cell configuration information and performing a measurement according to the neighbor cell configuration information.

18. The apparatus according to claim 17, wherein the processor circuitry is further configured to cause the UE to:

receive, from the NW element or another, an indication via an L1/L2 command, wherein the indication indicates which one or more cells are reference cells for relative measurements performed by the UE; and apply the one or more cells as the reference cells for the relative measurements.

19. The apparatus according to claim 18, wherein the L1/L2 command is one of MAC CE, or DCI.

20. An apparatus for operating a user equipment (UE), the apparatus comprising:

processor circuitry configured to cause the UE to:

encode a message for transmission to a network (NW) element including a UE capability information that includes at least one of:

an indication of a maximum number of neighbor cell groups that is supported by the UE;

an indication of a maximum number of neighbor cells in the neighbor cell groups that is supported by the UE;

an indication of a maximum number of activated neighbor cell groups of the neighbor cell groups that is supported by the UE;

an indication of whether the UE supports performing activation/deactivation on one or more of the neighbor cell groups without an indication from the NW element or another while a serving cell being changed; or an indication of whether the UE supports updating a reference cell for a relative measurement without an indication from the NW element or another while a serving cell being changed, and transmit the message to the NW element, wherein the neighbor cell groups correspond to respective serving cells.

* * * * *